United States Patent [19]
Williams

[11] Patent Number: 5,607,598
[45] Date of Patent: Mar. 4, 1997

[54] TREATMENT AND DISPOSAL OF RED MUD GENERATED IN THE BAYER PROCESS

[75] Inventor: Gerald M. Williams, Baton Rouge, La.

[73] Assignee: Ormet Corporation, Wheeling, W. Va.

[21] Appl. No.: 502,683

[22] Filed: Jul. 14, 1995

[51] Int. Cl.$^6$ .......................... B01D 24/46; B01D 21/26
[52] U.S. Cl. .......................... 210/772; 210/787; 210/806; 210/294; 423/121
[58] Field of Search .................... 210/767, 768, 210/772, 781, 787, 806, 380.1, 294; 423/119, 120, 121

[56] References Cited

U.S. PATENT DOCUMENTS

| | | |
|---|---|---|
| 3,649,185 | 3/1972 | Sato et al. .......................... 209/158 |
| 3,655,338 | 4/1972 | Shah . |
| 4,113,466 | 9/1978 | Weston . |
| 4,206,053 | 6/1980 | Houben . |
| 4,410,431 | 10/1983 | Roe . |
| 4,505,697 | 3/1985 | Lee et al. . |
| 4,609,534 | 9/1986 | The et al. .......................... 423/119 |
| 4,737,352 | 4/1988 | Owen et al. . |
| 4,906,388 | 3/1990 | Cain et al. . |
| 4,994,244 | 2/1991 | Fulford et al. .......................... 423/121 |
| 5,011,612 | 4/1991 | Keeney . |
| 5,043,077 | 8/1991 | Chandler et al. .......................... 423/121 |

*Primary Examiner*—David A. Reifsnyder
*Attorney, Agent, or Firm*—Webb Ziesenheim Bruening Logsdon Orkin & Hanson, P.C.

[57] ABSTRACT

Red mud bauxite residue produced in the Bayer Process is treated in a plurality of centrifuges and repulp tanks to successively wash and dewater the red mud. A final centrate liquor is obtained in a first upstream centrifuge stage which is rich in alumina and caustic values for respective recovery and reuse. The concentrated red mud cake produced in the final downstream washing/centrifuge step is low in caustic and alumina concentration permitting environmentally friendly disposal. The concentrated red mud cake is reslurried and mixed with bauxite sand for disposal in a dry stacking impoundment area.

16 Claims, 7 Drawing Sheets

TREATMENT AND DISPOSAL OF RED MUD GENERATED IN THE BAYER PROCESS

BACKGROUND OF THE INVENTION

The present invention relates to the treatment and disposal of bauxite residue or so-called "red mud" which is generated in the Bayer Process in the production of alumina ($Al_2O_3$). The alumina so produced may be further processed to yield aluminum metal or it may find use directly in numerous non-metallurgical applications.

In the Bayer process, alumina is extracted from naturally occurring bauxite ore. The bauxite is digested in a digester vessel at elevated temperatures and pressure with a strong solution of caustic soda (NaOH). In the presence of a strong base, the alumina acts as an acid to form sodium aluminate in solution. The impurities remain insoluble and form the red mud. The red mud is then separated from the green liquor solution by decantation and filtration. The green liquor formed at the high digestion temperature is cooled and becomes supersaturated at lower temperatures. The cooled liquor is then inoculated in a precipitator vessel with aluminum hydroxide crystals, $Al(OH)_3$, and agitated. A portion of the alumina gradually crystallizes and precipitates out of solution in hydrated form and is separated from the spent caustic liquor by filtration. After washing, the hydrate is calcined to the oxide form to provide a very pure alumina. It may also be collected and sold in the hydrate form. The spent caustic liquor and wash water, after concentration, are recycled and used for another digestion treatment of bauxite ore.

Conventionally, the red mud residue is removed from the digested slurry of bauxite and caustic soda/sodium aluminate liquor using a plurality of hydraulic thickeners/washers or pressure filters. Hydraulic thickeners are large vessels on the order of 100 feet in diameter, which require large volumes of water to achieve proper treatment and thickening of the red mud residue. These thickeners rely heavily upon the settling characteristics of the residue and are known to suffer major upsets when this characteristic changes. The large volumes of water associated with the thickeners must also be diminished by steam heating/evaporation which necessarily increases energy consumption and capital costs associated with the equipment and energy usage. These large vessels also require periodic cleaning of the dried red mud residue which, in itself, is a difficult and time-consuming task requiring shutdown of the thickener to remove the hardened residue over these very large surface areas.

Conventional pressure filters, on the other hand, rely on the filtration characteristics of the red mud. Such filtration characteristics may often change abruptly and without advance warning. Further, few bauxite ores produce a red mud residue possessing consistently good filtration characteristics. Such bauxite ores naturally occur in only specific bauxite deposits throughout the world and long term supply of such ores is oftentimes problematic.

Heretofore, it has been conventional practice to dispose of treated, i.e., washed and thickened red mud by impoundment in waste ponds or lakes. In such impoundment lakes, the red mud settles out by gravity and the supernatant liquor is returned to the process for reuse, such as hose water, wash water and the like, or it may be disposed of after proper treatment. As the red mud settles, it entrains about 45% by weight lake water which may contain, for example, up to about 35 grams per liter of caustic soda and 8 grams per liter of alumina which was present in the liquid portion of the red mud slurry when it was pumped to the impoundment lake. Thus, considerable quantities of caustic soda and alumina are lost to occlusion in the red mud impoundment lakes which represents a significant monetary loss. Aside from these chemical losses, the lake water itself poses a disposal problem from an environmental standpoint due to a high alkalinity. Groundwater runoff is not permissible unless the caustic lake water is neutralized.

In addition to the caustic and alumina losses and the negative environmental impact, conventional red mud impoundment lakes demand substantial land usage on a continuing basis. For example, a typical impoundment lake may occupy about 50–70 acres or more which is non-recoverable land and is useful for only about five years. In addition to the land costs, significant costs are realized in constructing and maintaining the dikes which retain the waste lake water and red mud.

The present invention solves the problems heretofore encountered in the treatment and disposal of red mud bauxite residue. The instant invention provides methods for treating red mud which, in one aspect, replaces the pressure filters of the prior art. Thus, the present invention eliminates the dependence upon the use of only a limited number of bauxite ores which heretofore had to be used in conjunction with pressure filters due to their consistent filtering characteristics. The present invention eliminates the need for pressure filters and their dependence upon such "good filtering" bauxite, which not only increases productivity but also permits the use of many other sources of bauxite ores which may be poorer in filtering characteristics.

The present invention also eliminates the need for numerous washing steps and large-sized thickener vessels presently used in the art. The invention thus provides a significant reduction in physical plant space required to house the apparatus for treating red mud, while also reducing the need for large volumes of wash water previously required in such existing process systems. Because the present invention minimizes the use of wash water, there is no need to construct extra evaporative heating capacity as is necessary in these conventional treatment systems.

Still further, the process of the present invention provides a treated red mud which contains minimal amounts of entrapped caustic and alumina. Concurrently, the wash water liquor recovered in the present invention contains significantly greater amounts of caustic and alumina values than previously recovered, and in an economical manner. The additional caustic value recovered from the red mud is then reused in the digestion process saving the expense of extra caustic additions heretofore required. Further, the higher levels of alumina values recovered from the red mud is recovered to provide a further economic advantage over conventional processes.

The present invention further includes a method for disposing of the treated red mud in a so-called "dry stacking" mode which eliminates the need and attendant expense of constructing and maintaining waste lakes. Capital costs for the apparatus employed in the dry stacking aspect of the invention are also lower than conventional methods.

SUMMARY OF THE INVENTION

According to the present invention, cooled, green liquor after sand removal is discharged to a holding tank. An underflow stream from the holding tank is fed to a conventional thickener. The overflow liquor from the thickener is fed to a bank of conventional red mud filters. The underflow from the thickener is controlled at about 25% by weight solids and fed to a first decanting type centrifuge stage. The term "centrifuge stage" as used herein means a pair of centrifuges, wherein one centrifuge is on line and the second is inactive but ready to go on line if the first centrifuge requires maintenance, for example. The first centrifuge stage deliquors the red mud to produce a mud cake having about 70% by weight solids content and a centrate liquor high in caustic and alumina concentrations which is returned to the thickener. A portion of this liquor is also drawn off for transfer to a filter feed tank for subsequent recovery of the alumina value and recycle of the caustic liquor to the digester.

The red mud cake from the first centrifuge stage is then repulped or reslurried and washed in a first repulp tank using a centrate liquor from a downstream centrifuge which has a caustic concentration lower than that of the red mud cake. The repulped and washed red mud from the first repulp tank having a solids content of about 25% by weight is then sent to a second centrifuge stage to produce a mud cake having about 70% by weight solids content and a lower caustic and alumina concentration than the mud cake from the first centrifuge stage. The centrate liquor from the second centrifuge stage is sent to the thickener and thence to the filter feed tank for recovery of the alumina value and reuse of the caustic in the digester. The red mud cake from the second centrifuge stage is washed in a second repulp tank with a still weaker centrate liquor supplied from a downstream centrifuge to further remove caustic and alumina values from the mud cake. The repulped and washed mud is then treated in a third centrifuge stage to again produce a mud cake having about a 70% by weight solids concentration of still lower caustic and alumina concentrations. The concurrently weaker centrate liquor from the third centrifuge stage is directed upstream and used as the wash liquor in the aforementioned first repulp tank. In this manner, a plurality of centrifuge stages and adjacent repulp tanks are employed. For example, four such centrifuge stages and repulp tanks may be used to wash and dewater the red mud in successive steps, using in a countercurrent flow direction of wash water (centrate liquor) relative to the process flow direction of the red mud. The red mud becomes successively less concentrated in caustic and alumina as it progresses from the first centrifuge stage to the last centrifuge stage while the wash water/centrate liquor increases in caustic and alumina concentrations as it moves in the countercurrent direction from the last repulp tank to the first repulp tank.

The concentrated centrate liquor, high in caustic and alumina recovered from the successive red mud washing treatments, is collected at the upstream end of the process and directed to the filter feed tank. The concentrated centrate liquor is then filtered to remove any remaining red mud residue. The filtrate liquor is then sent to the precipitators as a green liquor to recover any remaining alumina previously unclaimed and the spent liquor from the precipitator is then recycled to the digesters in order to reuse the reclaimed caustic value for the digestion of additional bauxite ore.

The red mud cake from the last centrifuge stage containing, for example, about 65%–75% by weight solids is directed to a mixing tank and reslurried using an acceptable transport water to produce a slurry having a solids content of about 55% by weight. The reslurried red mud is then pumped to cells in a remote red mud impoundment area, preferably using a piston-driven diaphragm pump. As the concentrated red mud is pumped into one cell, the red mud in another cell is permitted to harden and dry. After the mud is dry, it is moved to form dikes around the perimeter of the cell to prepare the cell for reception of a new supply of red mud slurry. Rainwater runoff from the hardened mud may be neutralized and pumped into adjacent waterways for safe disposal or returned to the process for use as wash water. The so-called bauxite "sand" in the form of over-sized bauxite particles (+70 mesh) recovered in the cyclone separators may also be mixed with the red mud in the aforementioned mixing tank and sent to the disposal site in the dry stacking operation.

These as well as other advantages and attributes of the present invention will become readily apparent when reference is made to the following detailed description when taken with the appended drawings.

DETAILED DESCRIPTION OF THE INVENTION

Figure 1A:
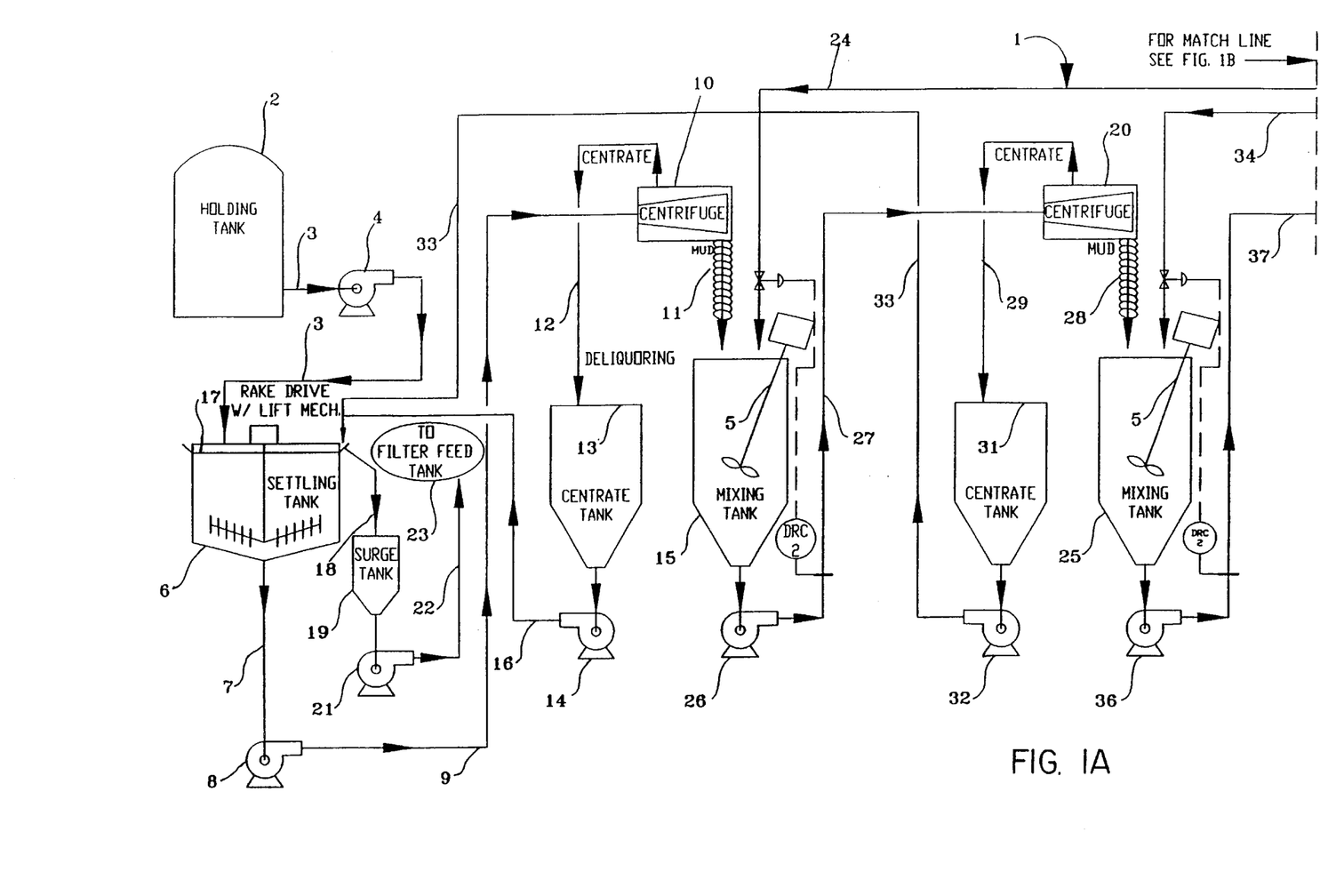
FIG. 1 is a schematic representation of a process and apparatus for deliquoring and washing of red mud according to the present invention.
Figure 1B:
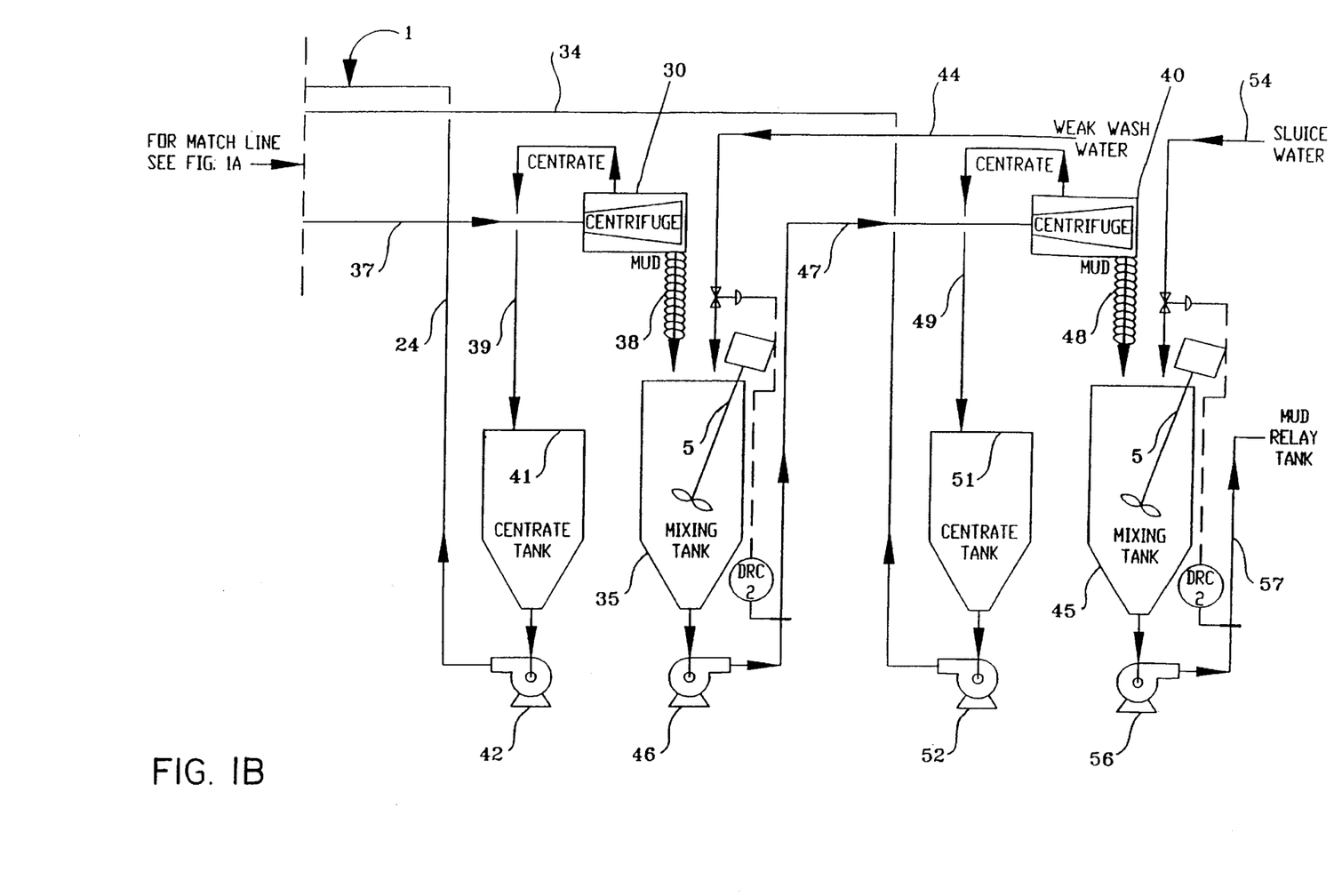

A schematic layout of a presently preferred embodiment of the present invention, generally designated 1, is depicted in FIG. 1. The exemplary process parameters of the invention are set forth in detail on the schematic of FIG. 2 wherein like reference numerals are used in the various drawing figures to identify identical elements therein.

Figure 2A:
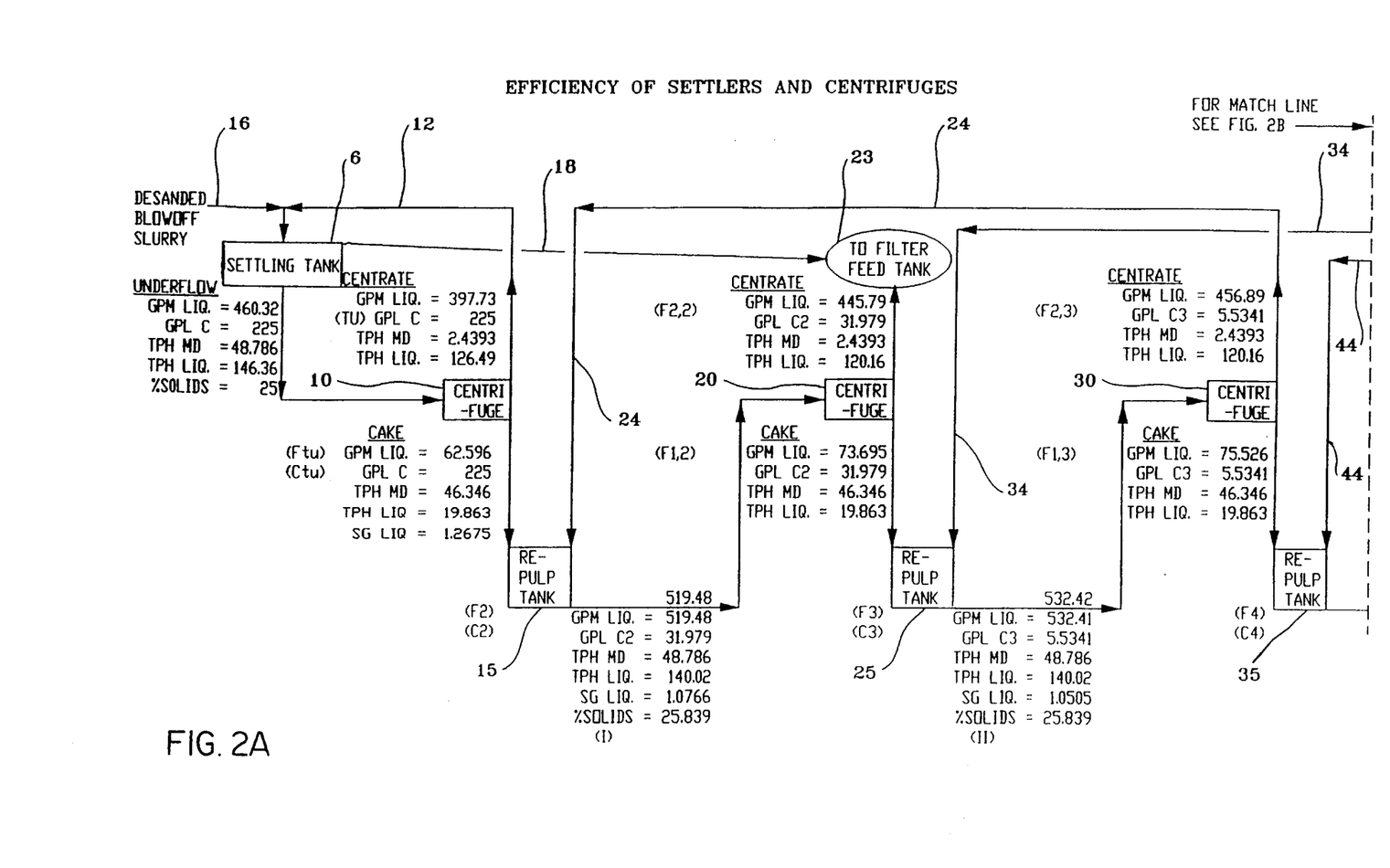
FIG. 2 is a more detailed example of the process schematic of FIG. 1 indicating a given set of process parameters thereon in the practice of the present invention.
Figure 2B:
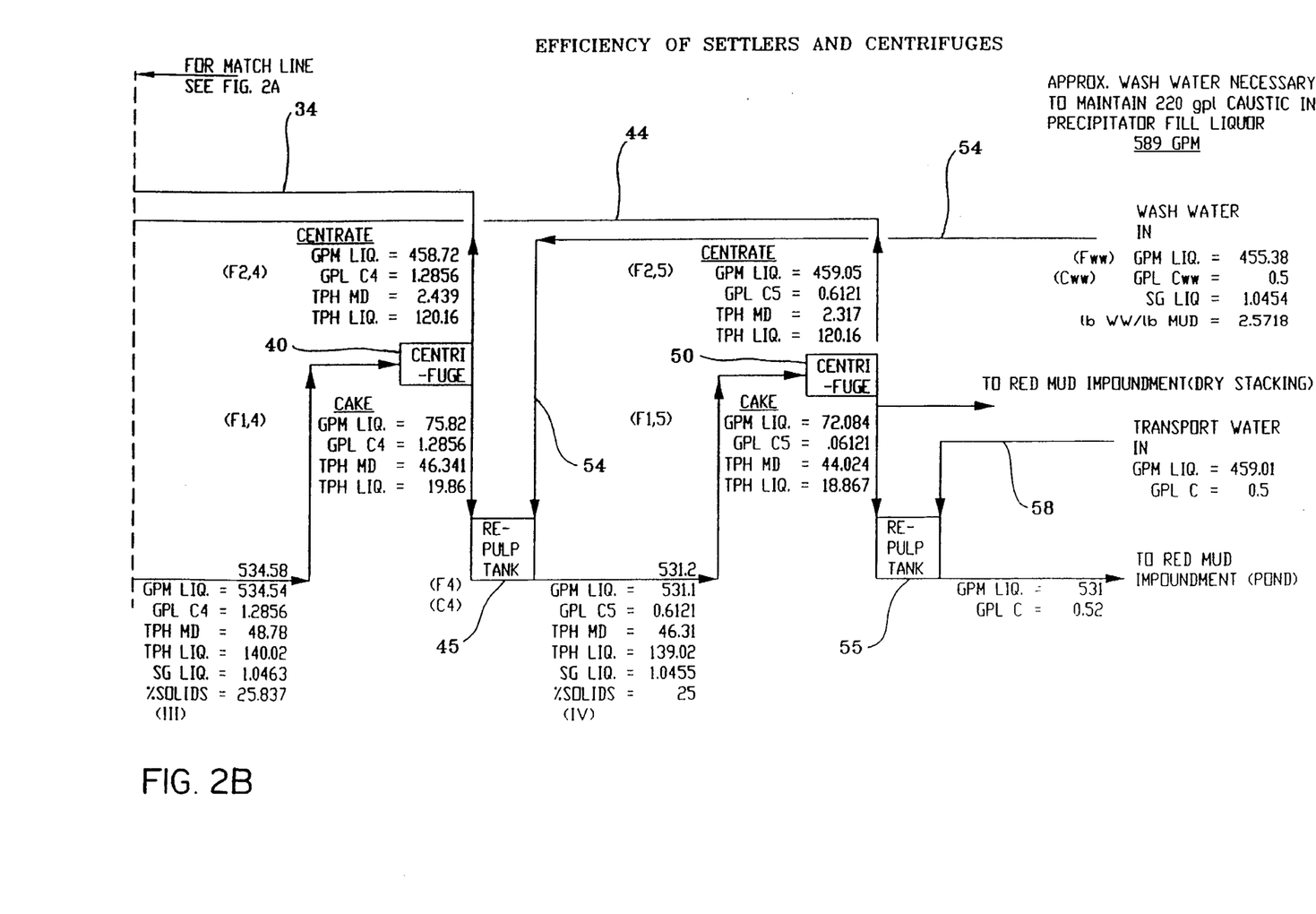

In the production of alumina in the Bayer process, the mixture of bauxite and caustic liquor in slurry form is digested at an elevated temperature and pressure. The green liquor produced by the digestion process contains a slurry mixture of a sodium aluminate solution with the undissolved insoluble impurities containing silicon and iron forming the so-called red mud residue. This slurry from the digestion process is cooled in a series of cooling tanks known as blow-off tanks. The oversized bauxite particles known as "sand" are removed by cyclone separators. The blow-off green liquor, after sand removal, is discharged to a surge or holding tank 2 of the present invention as depicted in FIGS. 1 and 2 or directly to the settling tank 6. If a surge or holding tank 2 is utilized, the underflow stream from the holding tank 2 is fed via a conduit 3 and pump 4 to a settling tank 6. The settling tank is a conventional thickener vessel having a rotatable rake at the bottom thereof for moving the settled red mud particulate material to a underflow drain and conduit 7 which is then moved by pump 8 through a conduit 9 to a first centrifuge stage 10. It will be seen in the embodiment depicted in FIG. 1 that four centrifuge stages are employed; namely, a first centrifuge stage 10, a second centrifuge stage 20, a third centrifuge stage 30 and a fourth centrifuge stage 40, whose functions will be explained in greater detail hereinafter. The centrifuges are decanting-type centrifuges. One presently preferred centrifuge for use in the invention is model "HYSEP MD 83" centrifuge supplied by Niro Separation Inc. of Houston, Tex. Centrifuges of the decanting, countercurrent flow type having a hydraulic motor drive are preferred.

The underflow red mud slurry from the settler 6 delivered to the first centrifuge stage 10 via conduit 9 contains about 25% by weight solids. After treatment in the first centrifuge stage 10, a deliquored red mud cake is produced with a solids content of about 65%–70% by weight. The mud cake is conveyed by way of a screw feeder conduit 11 or is directly discharged to a first repulp or mixing tank 15. The centrate from the first centrifuge stage 10 is a liquor containing high concentrations of caustic and alumina. In the deliquoring cycle involving the first centrifuge stage 10, the feedstock slurry from the settling tank 6, as well as the centrate liquor and the red mud cake from the centrifuge stage 10 all contain identical caustic concentration since no wash water has been added at this point. In the example schematically illustrated in FIG. 2, a typical caustic content at this stage in the deliquoring cycle involving first centrifuge stage 10, is on the order of 225 grams per liter (g/l) caustic in the centrate liquor and in the concentrated mud cake. The centrate liquor leaves the first centrifuge stage 10 by way of a conduit 12 and is fed to a centrate tank 13.

A pump 14 transfers the centrate liquor from tank 13 via a conduit 16 to the feed well of the settling tank 6 or, depending on its clarity, the centrate liquor may be discharged to an overflow trough 17 at the top of the settling tank 6 which flows through an overflow conduit 18 to a surge tank 19. Clarified green liquor from the settling tank 6, likewise, overflows into the trough 17 for removal into the surge tank 19. A pump 21 then causes transport of the green liquor and centrate liquor from the surge tank 19 via conduit 22 to a filter feed tank 23. The concentrated liquor is then filtered to remove any remaining red mud residue therein (not shown). The filtrate is then sent to the precipitators where a portion of the aluminum hydroxide is removed and the spent liquor from the precipitators is then recycled to the digesters to reuse the recovered caustic values therein in the digestion of new bauxite. A known polymer settling aid comprising a long chain organic polymer may be used in the thickener to assist in agglomerating and settling the red mud solids in the settling tank. Use of such a polymer in the centrifuge feed or in the centrate liquor is optional.

The deliquored red mud cake from the first centrifuge stage 10 is transported via screw feeder or conveyor 11 or is directly discharged to the repulp tank 15 where it is mixed with and washed by a centrate liquor supplied via conduit 24 which is in fluid communication with the third centrifuge stage 30. The mud cake entering repulp tank 15 has a caustic content, for example, about 225 g/l, while the centrate liquor supplied from centrifuge stage 30 is substantially weaker having a caustic content of about 5.5 g/l as set forth in FIG. 2. The mud cake entering repulp tank 15 has a solids content of about 70% by weight and is reslurried to a consistency of between about 15%–30% by weight solids and has a caustic content of about 32 g/l.

The reslurried mud from repulp tank 15 is then transported via pump 26 and conduit 27 to the second centrifuge stage 20. The repulped mud slurry is dewatered in the second centrifuge stage 20 to produce a concentrated red mud cake having a solids content of about 70% by weight which is then moved by a screw conveyor 28 or is directly discharged to a second repulp tank 25. The concentrated red mud cake as well as the centrate liquor produced in the second centrifuge stage 20 both contain the same caustic concentrations, namely, about 32 g/l in the example of FIG. 2. The centrate liquor is removed from the second centrifuge stage via a conduit 29 and delivered to a second centrate tank 31. A pump 32 transports the centrate liquor from tank 31 via a conduit 33 to the top of the settling tank 6 for overflow into the weir 17 and eventual delivery to the filter feed tank for recovery of the alumina value and reuse of the caustic contained therein as previously described.

The mud cake from the second centrifuge 20 is mixed and washed in the repulp tank 25 with a centrate liquor of still further weakened caustic concentration delivered to the second repulp tank 25 by way of a conduit 34 which is in fluid communication with the fourth centrifuge stage 40. The centrate liquor from the fourth centrifuge stage 40 has a caustic content of about 1.3 g/l in the example of FIG. 2. Once again, the red mud cake is repulped in the second repulp tank 25 to a level of between 15%–30% by weight solids. The repulped slurry from tank 25 having a caustic content of about 5.5 g/l is transported by pump 36 through a conduit 37 to the third centrifuge stage 30. It will be noted that the repulp tanks 15, 25, 35 and 45 each are equipped with a motor driven stirring paddle 5 to assure thorough mixing of the red mud and centrate liquor within each of the repulp tanks.

The dewatered red mud cake from the third centrifuge stage is transported via a screw conveyor 38 or is directly discharged to the third repulp tank 35. The centrate liquor from the third centrifuge stage is removed via a conduit 39 for deposit into a centrate tank 41. The centrate liquor is then moved by a pump 42 through the conduit 24 to the first repulp tank 15 as previously described. The mud cake from the third centrifuge stage 30 also has a solids content of about 70% by weight and is washed and repulped with a weak centrate liquor wash water supplied by way of a conduit which preferably is supplied by a fifth dewatering centrifuge stage 50 shown in FIG. 2 (but not in FIG. 1). This weak wash water has a caustic concentration of about 0.6 g/l and is used to repulp the mud cake in the tank 35 to a slurry containing about 26% by weight solids. The so-produced slurry is then transported by pump 46 through a conduit 47 to the fourth centrifuge stage 40. The concentrated red mud cake from the fourth centrifuge 40 is transported via a screw conveyor 48 or is directly discharged to the fourth repulp tank 45. The centrate liquor from the fourth centrifuge stage passes through a conduit 49 to a centrate tank 51 and is moved by a pump 52 through the conduit 34 to the second repulp tank 25 as previously described to repulp and wash the concentrated red mud from the second centrifuge stage 20. At this point, the red mud and the centrate liquor produced in the fourth centrifuge stage 40 have a caustic content of about 1.3 g/l.

The dewatered mud cake from the fourth centrifuge stage 40 is then mixed in the repulp tank 45 with a wash water having a low caustic content (0.5 g/l in FIG. 2) supplied through a conduit 54. The mud cake is then reslurried in the repulp tank 45 to a slurry containing about 25% solids having a caustic content of about 0.6 g/l concentration. At this stage, the washing of the red mud is completed since the optimum caustic and alumina values have been recovered from the red mud residue to allow disposal of the red mud in an environmentally and economically acceptable manner.

The repulped slurry from the fourth repulp tank 45 is transported by way of a pump 56 through a conduit 57 to the fifth centrifuge stage 50 for a final dewatering treatment therein. The centrate liquor from the fifth centrifuge stage containing a caustic concentration of about 0.6 g/l is removed from the centrifuge by way of a conduit 44 for delivery as the centrate liquor/wash water to the third repulp tank 35 as previously described, wherein the red mud cake from the third centrifuge stage 30 is washed and reslurried.

The mud cake concentrate from the fifth centrifuge stage 50 is delivered to a repulp tank 55 to be mixed with a transport water which has a caustic content of about 0.5 g/l. The transport water is delivered to the repulp tank 55 by way of a conduit 58 shown in FIG. 2. The dewatered mud cake from the centrifuge stage 50 is of a consistency of about 60 to 70% solids. This mud cake is reslurried in the repulp tank 55 to a 55% solids content minimum.

Figure 4:
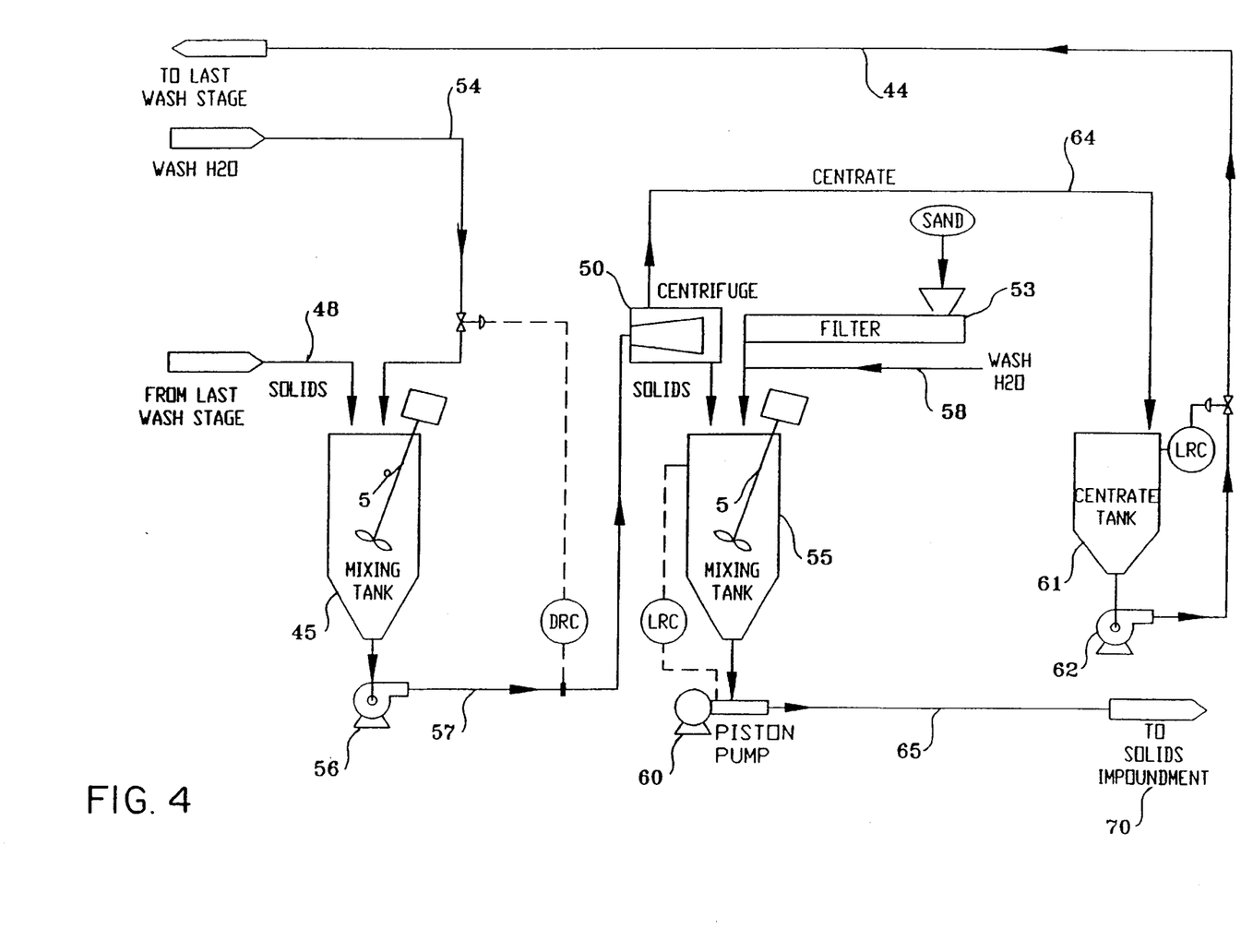
FIG. 4 is a schematic drawing of the apparatus for use in preparing the red mud for disposal in a dry stacking impoundment area according to the present invention.

The final preparation of the red mud for disposal in a so-called dry stacking impoundment is more clearly understood with reference to FIG. 4. The oversized bauxite sand particles are recovered in the cyclone separators after digestion and cooling in the blow-off tanks. The sand is slurried and treated in a filter 53 for deposit into the repulp tank 55. In the tank 55 the sand particles are mixed with the red mud cake from the fifth centrifuge stage 50 and sufficient wash water from conduit 58 to produce the slurry having a solids content preferably above 55% by weight. A piston-driven diaphragm pump 60 receives the reslurried red mud from the tank 55 and moves it through a conduit 65 to a red mud dry stacking impoundment area 70 for disposal thereof. The centrate from the fifth centrifuge stage 50 is transported through a conduit 64 to a centrate tank 61 and thence through a pump 62 through a conduit 44 for use as the centrate liquor/wash water in the third repulp tank 35 as previously described.

The solids content of the slurry material sent to the impoundment area 70 may comprise 100% red mud or a mixture of upwards of 80% red mud and 20% sand. An average solids mixture of 85% red mud and 15% sand has been found to be particularly suitable and permits a high solids concentration in the slurry, of for example, upwards of 60% by weight solids concentration. The impoundment area 70 may be located at a considerable distance from the plant site, i.e., on the order of several miles, for example. Final dry stacking heights of the disposed material may reach upwards of 40 feet, for example.

The pump 60 is preferably a piston diaphragm pump, such as a model GEHOZPM series pump, which is a double acting crankshaft driven high pressure piston diaphragm pump manufactured by GEHO Pumps, Inc., Mississauga, Ontario, Canada. The diaphragm protects the pump's moving parts against abrasive wear which is important when pumping abrasive slurries such as red mud.

Dry stacking of conventionally processed red mud utilizing a final filtering operation or the use of a so-called super thickener to increase the solids content is known in the art. Prior to the present invention, it was not believed, however, that a centrifuge has ever been used to treat the red mud prior to dry stacking disposal. Tests were conducted on red mud cake from the fifth centrifuge stage 50. The Miller number, which is an abrasive index, was measured at 50 for pure red mud and at 78 for an 85/15% mud/sand mixture, which is considered to be relatively low for a bauxite residue. The rheology was measured on samples with a solids concentration between 45% and 65% of 100% pure red mud slurry and mud sand mixtures in the ratio of 85/15. It was concluded that for dry stacking, the preferred concentrations are between 50% and 60% solids. Pipe loop tests were conducted in a 50 mm (2 inch) pipe loop and an 80 mm (3 inch) pipe loop at four different solids concentrations with pure 100% red mud and 85/15 mud sand mixture each at four different flow rates for a total of 250 measurements. The red mud and red mud sand mixture produced by the present invention behave as a Bingham plastic fluid, but has in comparison to other red muds a very low thixotropy. Thus, the treatment of the red mud in the centrifuge improves its properties compared with red mud which has been thickened conventionally. For dry stacking, where a slope disposal between 2% and 6% is generally accepted, the presently processed red mud/sand mixture according to the present invention meets this requirement. At the lower end, a pure red mud slurry at 47.5% solids concentration is acceptable and at the high end, an 85/15% red mud/sand mixture at a 60% solids slurry concentration meets these dry stacking requirements. A GEHO piston diaphragm pump supplied by Envirotech Pump Systems type TZPM 250 having a 6-inch piston with a 14-inch stroke length at a stroke rate maximum of 52 strokes per minute is capable of transporting approximately 50 tons per hour of red mud and sand or approximately 1200 tons per day over a distance greater than 7000 feet from the plant site to the impoundment area 70 at a final stacking height of 40 feet.

Figure 3:
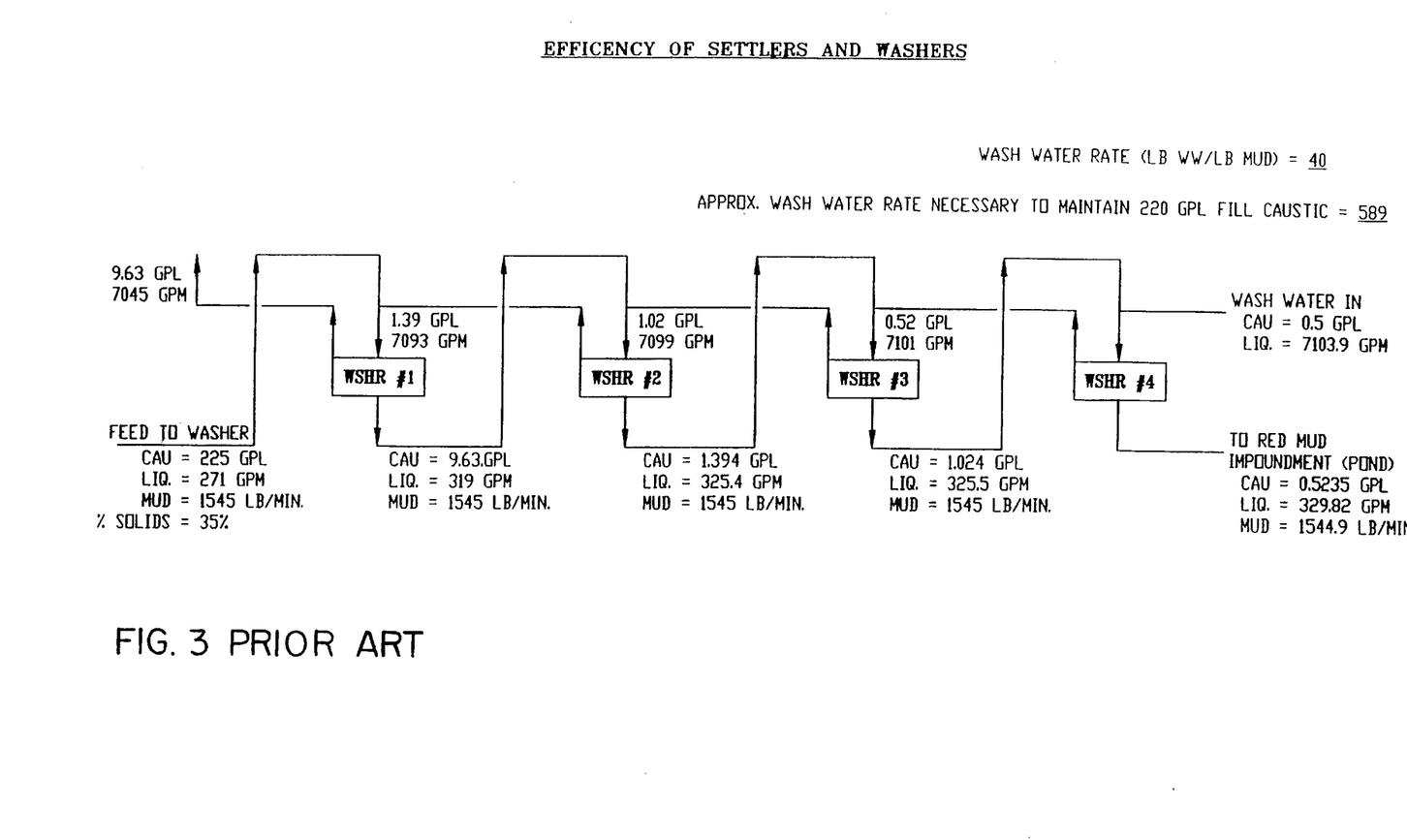
FIG. 3 is a schematic drawing of a prior art method depicting a prior art method for treating red mud employing settlers and washers.

The efficiency of the process and apparatus of the present invention may be further appreciated by comparing the schematic of FIG. 2 with a process of using the prior art apparatus depicted schematically in FIG. 3. The process of FIG. 3 employs a thickener similar to the thickener 6 of FIG. 2 along with four washers of the type commonly used in the prior art. The red mud underflow from the thickener is moved to washer #1 and treated with the wash water which overflows from washer #2. This is a conventional countercurrent treatment scheme where the wash water moves in a countercurrent direction relative to the red mud underflow from each of the washers. In the comparative process depicted in FIG. 3, the rate of wash water flow necessary to produce a final water concentration comparable to that of four stage wash using the invention is shown. It should be noted, however, that the wash rate required in FIG. 3 is far in excess of the volume needed to maintain plant volume equilibrium (7084 gallons per minute versus 589 gallons per minute) and is, in fact, impractical.

The excess water would have to be evaporated to maintain acceptable plant operating volume. Thus, evaporation facilities or additional wash stages which would reduce the amount of water required would have to be provided. In the first case, the additional energy consumption and capital investment would be significant. In the second case, the capital investment would be significant.

It should also be noted that the washers #1–4 of FIG. 3 are large structures on the order of about 125 feet in diameter and necessarily occupy a large plant area compared with the centrifuge and repulp tanks of the present invention. A typical repulp tank 15 of the present invention is about 10 feet in diameter by way of comparison. In fact, all of the centrifuges and repulp tanks used in the present invention depicted in FIG. 1 would occupy the space required for one of the prior art washers of FIG. 3.

Figure 5:
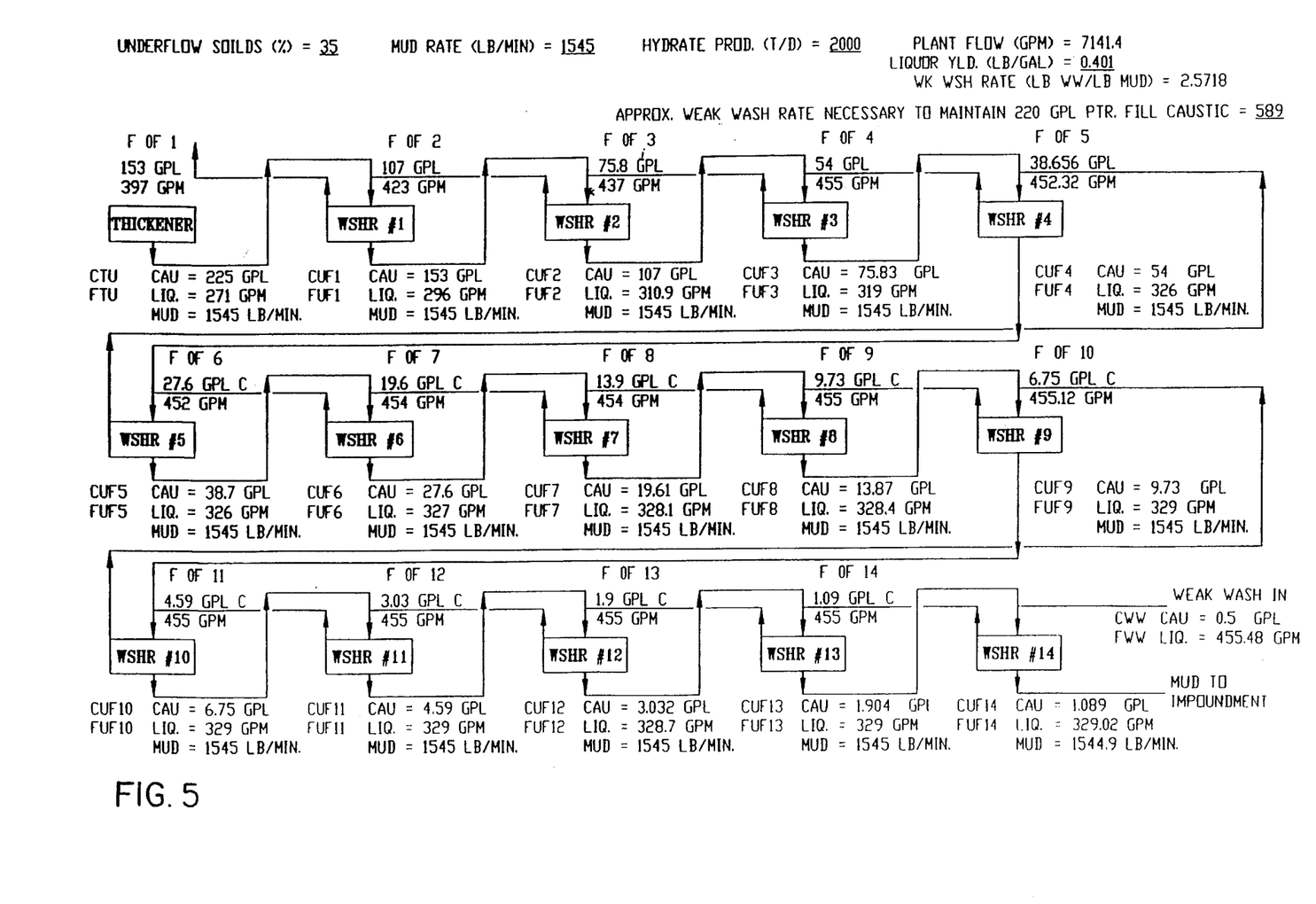
FIG. 5 is a schematic drawing of a hypothetical process using thickeners and washers of the prior art.

In order to reduce the caustic level of the red mud to that of the present invention, a conventional thickener and washing treatment scheme according to the prior art would require a total of 14 washing vessels. Such a comparative example is depicted in FIG. 5. It is noted that the red mud underflow from washer #14 in FIG. 5 has a caustic content of 1.1 g/l, whereas a caustic level of 0.5 g/l was realized after only the fourth washing treatment in the present invention. Thus, it will be readily appreciated that the conventional prior art red mud treatment apparatus employing settlers and washers shown in FIGS. 3 and 5 are not capable of treating red mud in the same efficient manner as the present invention. These prior art apparatus require larger amounts of wash water and physically larger treatment tanks requiring significantly more space and capital costs than the process of the instant invention.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. A method for treating a red mud bauxite residue comprising:

providing a plurality of centrifuges, including a first centrifuge and a last centrifuge, and a plurality of repulp tanks;

treating the red mud successively in the centrifuges, from the first centrifuge to the last centrifuge, to produce a dewatered mud cake and a centrate liquor in each centrifuge;

washing the mud cake from each centrifuge successively in the repulp tanks using a centrate liquor from a downstream centrifuge to reslurry the red mud prior to each centrifuge treating step, whereby, the red mud becomes lower in caustic and alumina concentrations as said red mud is successively treated in a downstream direction and said centrate liquor becomes more concentrated in caustic and alumina concentrations as said centrate liquor is successively used in the washing of the red mud cake in an upstream direction; and recovering an alumina value and reusing the caustic contained in the centrate liquor produced in the first centrifuge.

2. The method of claim 1 including disposing of the red mud cake produced in the last centrifuge in an impoundment area using a dry stacking mode of disposal.

3. The method of claim 2 wherein the red mud cake from the last centrifuge is subjected to a reslurrying step to produce a solids content of between about 45% to 60% weight prior to pumping the reslurried red mud to said impoundment area.

4. The method of claim 3 including the step of mixing bauxite sand with the red mud cake in the reslurrying step to create a solids mixture containing up to about 15% by weight sand and no less than about 85% by weight red mud cake at a 60% by weight total solids concentration in said reslurried mixture.

5. The method of claim 1 wherein the red mud cake has a solids of content on the order of about 65% to 75% by weight after each treating step in each centrifuge and wherein each washing step reduces the solids content to a level of about 15% to 30% in the reslurried red mud cake.

6. The method of claim 1 wherein the recovery of the alumina value and reuse of the caustic in the centrate liquor includes the steps of filtering said centrate liquor to remove a red mud residue and thereby producing a filtrate liquor; introducing said filtrate liquor to a precipitator to recover alumina in said filtrate liquor; and reusing the filtrate liquor from said precipitator in a digester to treat bauxite ore.

7. The method of claim 1 which includes at least four centrifuge treating steps and at least four washing steps.

8. The method of claim 7 including a fifth centrifuge treating step followed by a reslurrying step to produce a reslurried red mud cake for disposal by dry stacking in an impoundment area.

9. The method of claim 1 including the step of treating the red mud in a thickener to produce a thickened red mud underflow for treating in the first centrifuge.

10. A method for treating and disposing of a red mud residue comprising the steps of:

providing at least two centrifuges, including a first centrifuge and a last centrifuge, and at least two repulp tanks;

treating the red mud in said centrifuges to deliquor said red mud and to produce a red mud cake and a centrate liquor;

reslurrying the red mud in said repulp tanks;

treating the centrate liquor from the first centrifuge to recover an alumina value and reusing said liquor in a digestion process;

disposing of said treated and reslurried red mud by dry stacking in an impoundment area.

11. A method for treating and disposing of red mud residue comprising the steps of:

thickening the red mud residue in a thickener vessel;

collecting an overflow liquor from the thickener vessel for recovery of an alumina value therein and for reusing a caustic value therein;

collecting a thickened red mud in a bottom underflow from said thickener vessel;

providing a first centrifuge for treating the thickened red mud from said thickener vessel to produce a deliquored red mud cake and a centrate liquor, wherein said red mud cake has a solids content of about 65% to 75%;

collecting said centrate liquor from said first centrifuge for recovery of an alumina value therein and for reuse of a caustic value therein;

washing said red mud cake in a first repulp tank using a centrate liquor having a caustic concentration of a lower value than a caustic concentration of said red mud cake to produce a reslurried red mud having a solids content of about 15% to 30%, and having a caustic concentration lower than that contained in the red mud cake produced in said first centrifuge;

treating said reslurried red mud from the first repulp tank in a second centrifuge to dewater the reslurried red mud and to produce a red mud cake and a centrate liquor;

collecting said centrate liquor from said second centrifuge for recovering of the alumina value therein and for reuse of the caustic value therein;

washing the red mud cake from said second centrifuge in a second repulp tank using a centrate liquor having a caustic concentration of a lower value than the caustic concentration of red mud cake from the second centrifuge to produce a reslurried red mud having a still lower caustic concentration than that of the red mud cake from the second centrifuge;

treating the reslurried red mud in a plurality of additional centrifuges and repulp tanks to produce a dewatered red mud cake and a centrate liquor having caustic concentrations lower than a caustic concentration of the red mud cake and centrate liquor produced in a preceding treatment step; and disposing of the red mud treated in a last centrifuge and reslurry tank by dry stacking in an impoundment area.

12. The method of claim 11 wherein the mud cake produced by the centrifuge in each of said treating step comprises about 65% to 75% by weight solids, wherein the repulped red mud comprises about 15% to 30% by weight solids and wherein reslurried red mud prepared for dry stacking contains about 45% to 60% by weight solids.

13. A method of treating red mud residue for dry stacking disposal, comprising:

successively treating the red mud in at least two centrifuges and repulp tanks to wash and dewater the red mud whereby a caustic concentration of said red mud is lowered;

providing a treated red mud having a controlled solids content of between about 45% to 60% by weight;

pumping said red mud of controlled solids content to an impoundment area.

14. The method of claim 13 wherein the pumping is conducted by use of a piston diaphragm pump.

15. The method of claim 13 including the step of mixing a bauxite sand with the treated red mud prior to said pumping step.

16. The method of claim 15 wherein the mixture of bauxite sand and red mud comprises up to about 15% by weight bauxite sand and no less than about 85% by weight red mud.

* * * * *

UNITED STATES PATENT AND TRADEMARK OFFICE
CERTIFICATE OF CORRECTION

PATENT NO.   : 5,607,598
DATED        : March 4, 1997
INVENTOR(S)  : Gerald M. Williams It is certified that error appears in the above-indentified patent and that said Letters Patent is hereby corrected as shown below:

Column 4 Line 59 "a underflow" should read --an underflow--.

Column 7 Line 35 ", of for example," should read --of, for example,--.

Column 7 Line 65 "mud sand mixture" should read --mud/sand mixture--.

Column 7 Line 67 "mud sand mixture" should read --mud/sand mixture--.

Claim 5 Column 9 Line 51 "solids of content" should read --solids content--.

Claim 13 Column 11 Line 10 after "weight;" insert --and--.

Signed and Sealed this

Twentieth Day of May, 1997

Attest:

BRUCE LEHMAN

*Attesting Officer*          *Commissioner of Patents and Trademarks*